(No Model.)
C. L. HOBBS.
AIR PIPE COUPLING.
No. 278,961. Patented June 5, 1883.
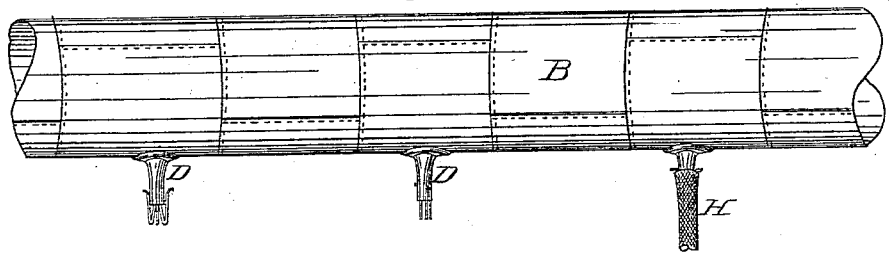
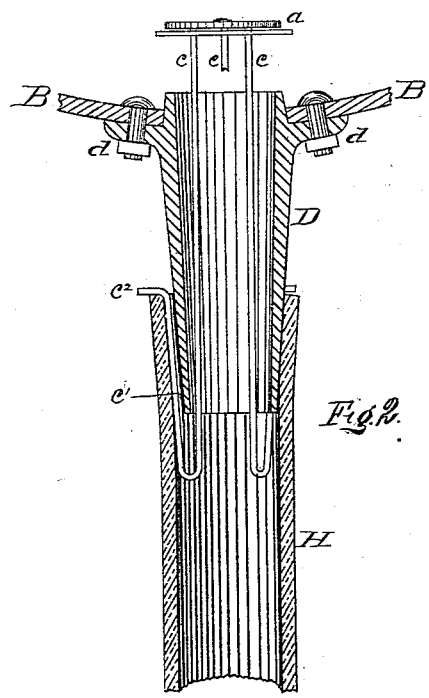
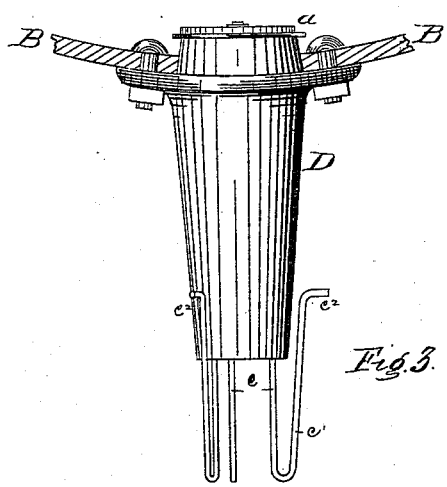
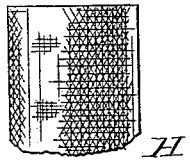
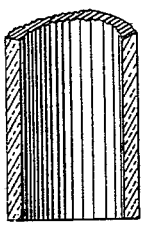
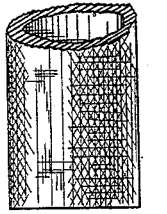
Witnesses
R. H. Whittlesey
C. M. Clarke
Inventor Charles L. Hobbs,
By Attorney George H. Christy

UNITED STATES PATENT OFFICE.

CHARLES L. HOBBS, OF WHEELING, WEST VIRGINIA.

AIR-PIPE COUPLING.

SPECIFICATION forming part of Letters Patent No. 278,961, dated June 5, 1883.

Application filed March 12, 1883. (No model.)

*To all whom it may concern:*

Be it known that I, CHARLES L. HOBBS, of Wheeling, county of Ohio, State of West Virginia, have invented or discovered a new and useful Improvement in Air-Pipe Couplings; and I do hereby declare the following to be a full, clear, concise, and exact description thereof, reference being had to the accompanying drawings, making a part of this specification, in which—like letters indicating like parts—

Figure 1 is a view in elevation of a portion of an air-supply pipe—such as is commonly used in glass-houses, or glass-manufacturing establishments, for the purpose of supplying air with which to cool the molds, or for other purposes—and with three of my improved coupling-nozzles affixed thereto. Fig. 2 is a vertical sectional view of one of said nozzles with a section of the hose-pipe attached thereto, and showing the position of the device when in condition for use. Fig. 3 shows the same in elevation, but with the hose detached and with the valve closed.

In the operation of pressing or blowing glass in molds, particularly when the work is carried on with rapidity, the molds are liable to become very hot, and consequently injured. To remedy this an air-pipe has been introduced in such manufacturing-establishments, so as to furnish a supply of air, which being blown onto or into the molds during the intervals between blowing or pressing tends to keep them cool, or at a comparatively low temperature. Such pipes are usually arranged overhead and properly secured in place, and at suitable intervals a branch connection is made by which to take a portion of the air from the main pipe to any particular press, where it may be used for the purpose stated.

My invention relates to the construction of an improved coupling-nozzle provided with a valve, so arranged that the hose may readily be placed thereon or attached thereto, and so that when thus attached the valve will be opened in the act of making attachment and will remain open, and also so that when the hose is detached the valve will automatically come to its seat and prevent escape or waste of air.

A portion of the main or trunk pipe is represented at B, and this may be made of plate-iron, in the manner common in boiler or tank making, or may be made of large gas-pipe or oil-tubing, the latter being cheaper, and ordinarily sufficient. This main or trunk pipe is ordinarily carried around the works immediately over the glass-presses or other object or place where the use of air is desired for the purposes named, and immediately over each such point, object, or place, or in convenient proximity thereto, I tap the main pipe and screw into the tap-hole, or over it, a nozzle, D, and by means of bolts and flanges $d$ secure the nozzle to the main or trunk pipe. Each nozzle is preferably made tapering on its exterior face. On its inner or upper end I make a valve, $a$, of any suitable construction, and provided with suitable packing, so that it may be seated on the inner or upper end of the nozzle or be lifted from such seat. From this valve a series of two or more wires, $c$, extend down through the nozzle a short distance beyond, and such wires are bent back outside the nozzle, as at $c'$, and their extreme ends are bent outwardly, as at $c^2$.

The hose H, by means of which air is conveyed from the trunk-pipe B to the glass mold or press, or other point or place where the use of air is desired, is then connected with the nozzle D by slipping its end over the lower projecting ends of the wires, and as it is pushed up by the hand of the workman it is caused to engage the outwardly-bent ends $c^2$ and push the wires upward, and with it lift valve $a$ clear of its seat, as represented in Fig. 2. It will then be seen that the lower end of the flexible hose H (it being made of suitable length) may be placed at any point where the use of air for cooling purposes is desired, and that the usual passage-way will then be provided for a continuous flow of air, so long as the use of it is required or desired at such point or place. After that the hose may be slipped off the wires and nozzle, and the valve $a$ will then come to its seat, as shown in Fig. 3, so that all waste air is prevented. When the hose is slipped onto the nozzle, as in Fig. 2, it will by its resiliency make a joint or connection with the nozzle sufficiently tight for the purposes in view.

The device thus described possesses the advantage of being automatic in its action, simple and cheap in construction, and also in the fact that it does not require, as in other couplings of this class, any special devices for opening the valve. The end of the hose as it is attached does the work.

I claim herein as my invention—

1. The combination of a pipe nozzle or coupling adapted for making connection with a flexible hose by the slipping of the open end of the hose thereon, a self-seating valve in such nozzle or coupling, and a suitable mechanism connected with the valve and engaged by the open end of the hose while being slipped onto the nozzle, whereby to unseat the valve, substantially as set forth.

2. In combination with the pipe B and nozzle D, a valve, $a$, and a series of two or more wires, $c$, extending through the nozzle and bent back onto its outer face, and suitably shaped so that when engaged by the end of the flexible hose they lift the valve from its seat, substantially as described.

3. In combination with the nozzle D, the valve $a$ and wires $c$, projecting through the nozzle and each bent, as at $c'\, c^2$, substantially as set forth.

In testimony whereof I have hereunto set my hand.

CHAS. L. HOBBS.

Witnesses:
JACOB HANECKER,
R. McCONNEL.